United States Patent
Schwensfeier (10) Patent No.: US 10,854,087 B2
(45) Date of Patent: Dec. 1, 2020

(54) ASSISTANCE SYSTEM AND METHOD FOR TRANSFERRING DATA REGARDING AN ACCIDENT OR A BREAKDOWN OF A VEHICLE

(71) Applicant: AUDI AG, Ingolstadt (DE)

(72) Inventor: Florian Schwensfeier, Oberhausen (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 16/305,704

(22) PCT Filed: May 30, 2017

(86) PCT No.: PCT/EP2017/063053
§ 371 (c)(1),
(2) Date: Nov. 29, 2018

(87) PCT Pub. No.: WO2017/207579
PCT Pub. Date: Dec. 7, 2017

(65) Prior Publication Data
US 2019/0333392 A1    Oct. 31, 2019

(30) Foreign Application Priority Data
May 31, 2016   (DE) .................. 10 2016 006 687

(51) Int. Cl.
*G08G 1/00*     (2006.01)
*H04W 4/46*     (2018.01)
(Continued)

(52) U.S. Cl.
CPC ............. *G08G 1/205* (2013.01); *G07C 5/008* (2013.01); *G08G 1/0112* (2013.01);
(Continued)

(58) Field of Classification Search
USPC ........................................................ 701/117
See application file for complete search history.

(56) References Cited

U.S. PATENT DOCUMENTS 6,466,862 B1 * 10/2002 DeKock ............... G08G 1/0104
                                                  340/901
6,798,354 B2 *  9/2004 Schuessler ........... G08G 1/0965
                                                  340/471
(Continued)

FOREIGN PATENT DOCUMENTS

CN    102198826 A    9/2011
CN    202120382 U    1/2012
(Continued)

OTHER PUBLICATIONS

International Search Report and Written Opinion of the International Searching Authority directed to related International Patent Application No. PCT/EP2017/063053, dated Oct. 5, 2017, with attached English-language translation; 28 pages.
(Continued)

*Primary Examiner* — Tyler D Paige
(74) *Attorney, Agent, or Firm* — Sterne, Kessler, Goldstein & Fox P.L.L.C.

(57) ABSTRACT

The present disclosure relates to an assistance system for a first vehicle, comprising a detection unit for detecting accident- and/or breakdown-related data from at least one device in a vehicle, a position determining unit for determining the current position of the first vehicle, an evaluation unit for evaluating data detected by the detection unit and the position determining unit, and a communication unit for issuing data using radio signals—automatically or following the triggering of an actuating unit in the vehicle—concerning an area around the current position of the first vehicle to be avoided by other road users using the communication unit if the evaluation unit has determined—based on the evalu-
(Continued)

ation of the data collected—that the first vehicle has suffered an accident or that the first vehicle has experienced a breakdown.

5 Claims, 3 Drawing Sheets (51) Int. Cl.
*G07C 5/00* (2006.01)
*G08G 1/01* (2006.01)
*G08G 1/0968* (2006.01)

(52) U.S. Cl.
CPC ......... *G08G 1/0133* (2013.01); *G08G 1/0141* (2013.01); *G08G 1/096844* (2013.01); *H04W 4/46* (2018.02)

(56) References Cited

U.S. PATENT DOCUMENTS

| | | | | |
|---|---|---|---|---|
| 9,836,963 | B1* | 12/2017 | Hayward | G05D 1/0214 |
| 2001/0014849 | A1 | 8/2001 | King et al. | |
| 2003/0125853 | A1* | 7/2003 | Takagi | G07C 5/008 |
| | | | | 701/32.2 |
| 2004/0088090 | A1* | 5/2004 | Wee | G08G 1/205 |
| | | | | 701/33.4 |
| 2008/0088480 | A1* | 4/2008 | Rozum | G08G 1/096716 |
| | | | | 340/933 |
| 2010/0194558 | A1 | 8/2010 | Toh | |
| 2011/0210835 | A1* | 9/2011 | Kondo | G08G 1/205 |
| | | | | 340/425.5 |
| 2013/0222133 | A1* | 8/2013 | Schultz | G08B 25/006 |
| | | | | 340/539.13 |
| 2013/0281141 | A1 | 10/2013 | Rubin et al. | |
| 2014/0172496 | A1* | 6/2014 | Rosjat | G06Q 10/0635 |
| | | | | 705/7.28 |
| 2014/0306826 | A1* | 10/2014 | Ricci | G06Q 10/02 |
| | | | | 340/573.1 |
| 2014/0309812 | A1* | 10/2014 | Lee | H04L 67/12 |
| | | | | 701/2 |
| 2015/0319093 | A1* | 11/2015 | Stolfus | G08G 1/0133 |
| | | | | 370/237 |
| 2015/0371456 | A1* | 12/2015 | Moore, Jr. | G06K 9/00832 |
| | | | | 701/1 |
| 2016/0061625 | A1* | 3/2016 | Wang | G08G 1/0141 |
| | | | | 701/454 |
| 2016/0323233 | A1* | 11/2016 | Song | G08G 1/0141 |
| 2017/0046216 | A1* | 2/2017 | Stenneth | G01P 15/00 |
| 2017/0101054 | A1* | 4/2017 | Dusane | G08G 1/205 |
| 2019/0333392 | A1* | 10/2019 | Schwensfeier | G08G 1/096791 |

FOREIGN PATENT DOCUMENTS

| | | |
|---|---|---|
| CN | 103854471 A | 6/2014 |
| CN | 106469512 A | 3/2017 |
| DE | 3839959 A1 | 4/1990 |
| DE | 10007573 C1 | 9/2001 |
| DE | 60301245 T2 | 3/2006 |
| DE | 102006031240 A1 | 1/2008 |
| DE | 10 2008 062 118 A1 | 6/2010 |
| DE | 202012000823 U1 | 5/2012 |
| DE | 102012211568 A1 | 1/2014 |
| WO | WO 2015/170990 A1 | 11/2015 |

OTHER PUBLICATIONS

International Preliminary Report on Patentability directed to related International Patent Application No. PCT/EP2017/063053, dated Oct. 1, 2018, with attached English-language translation; 14 pages.

* cited by examiner

FIG. 3 ated by an evaluation electronic unit depending on the type of operation and a system reaction or optical or acoustic signal is issued on a navigation device accordingly. Moreover, internally-generated data, combined into a data telegram, are broadcast as a general standard broadcast, along with corresponding appended special messages, such as emergency identifications, through the transmitting receiver and the antenna.

ASSISTANCE SYSTEM AND METHOD FOR TRANSFERRING DATA REGARDING AN ACCIDENT OR A BREAKDOWN OF A VEHICLE

TECHNICAL FIELD

The present disclosure relates to an assistance system and a method for transferring data regarding an accident or a breakdown of a vehicle. The present disclosure further relates to a vehicle which can receive the transferred data.

BACKGROUND

There are known "emergency systems" for making an emergency call to an emergency call center (command center, reporting station) through a public mobile radio network (according to the 3G or 4G mobile radio standards, for example), such systems being contained in the vehicle and acting automatically or upon actuation of an actuator provided for in the case of an accident or breakdown of a vehicle. Such systems can shorten the time span between the occurrence of the accident or breakdown and the dispatching of suitable rescue or aid measures, which is advantageous.

For example, DE 38 39 959 A1 describes an emergency device for a vehicle which issues an emergency call in the event of a hazard, an accident or a breakdown, in particular an automatic call, the call being reproduced at a reporting station in plain text or via a loudspeaker. The emergency call can also convey the vehicle position, number of persons in the vehicle, vehicle-specific data such as the hazard class, and data regarding the course of events of the accident. Based on the data transmitted with the emergency call, the reporting station can introduce initial targeted measures.

The subject matter of DE 10 2006 031 240 A1 is an emergency call system for a vehicle, wherein the emergency call system includes at least one sensor unit for collecting accident-related data, an evaluation and control unit for estimating the type and extent of injuries to persons by evaluating signals from the at least one sensor unit, and a communication unit for automatically making an emergency call. The evaluation and control unit carries out an individual calculation of the severity of the injuries for each occupant and/or for an affected pedestrian and/or bicyclist and makes a disposition decision for each person depending on the calculated individual severity of injury, the disposition calling in a rescue service through the communication unit. In an emergency call system so designed, there is no need for comprehensive transfer of data to a reporting station and no evaluation of the transferred data in the reporting station.

In addition to the "targeted" issuance of an emergency call to an emergency call center using a public mobile radio network, such as a mobile phone or automatic phone in the vehicle which selects one of the emergency call center telephone numbers, data can also be sent and received by a vehicle through a so-called vehicle-to-vehicle communication or vehicle-to-infrastructure (often called a vehicle-to-X communication as a generalization), provided that the vehicle is equipped with a corresponding transmitting-receiver with short-range communication technology.

For example, DE 20 2012 000 823 U1 describes a mobile traffic jam warning system for vehicles for reporting and representing a status, an emergency call, an accident location or other traffic disruptions, reports from the BOS (public safety authorities and organizations), and as an auxiliary system for trips subject to impeded conditions. A transmitting receiver receives radio traffic data telegrams from other road users through an antenna; the received data are evaluated by an evaluation electronic unit depending on the type of operation and a system reaction or optical or acoustic signal is issued on a navigation device accordingly. Moreover, internally-generated data, combined into a data telegram, are broadcast as a general standard broadcast, along with corresponding appended special messages, such as emergency identifications, through the transmitting receiver and the antenna.

The objective of the present disclosure is to further improve the known devices and methods from the conventional techniques related to the issuance and processing of "emergency calls" due to an accident or a breakdown of a vehicle in a novel and inventive way such that advantages can be achieved as a result, the advantages not being possible with the solutions known from the conventional techniques.

SUMMARY

The present disclosure proceeds from an assistance system for a first vehicle comprising a detection unit for detecting accident- and/or breakdown-related data from at least one device in the vehicle, a position determining unit for determining the current position of the first vehicle, an evaluation unit for evaluating the data detected by the detection unit and the position determining unit and a communication unit for issuing data by means of radio signals.

The evaluation unit of the assistance system according to the present disclosure is designed to issue data—automatically or following the triggering of an actuating unit in the vehicle—concerning an area around the current position of the first vehicle to be avoided by other road users, using the communication unit with the aid of radio signals, if the evaluation unit has determined—based on the evaluation of the data collected—that the first vehicle has suffered an accident or experienced a breakdown.

However, other road users, in particular other vehicles—but also emergency call centers, public safety authorities and organizations (BOS), etc.—can also be directly and immediately notified, in ways which can already be known, about an accident or a breakdown of a first vehicle. Moreover, road users, in particular "uninvolved" road users—i.e. those which are not associated with a public safety authority or organization (BOS) or response and rescue unit —, can also receive notification to the extent of the area to be avoided around the first vehicle involved in the accident or around the stranded or slow-moving first vehicle which has had a breakdown. It is precisely the latter notification that is very important since unfettered access to the current position where the first vehicle in the accident or which is stranded or slow-moving due to the breakdown can be provided as much as possible this way for air, land and sea BOS vehicles, organizations which provide air, land and sea vehicles to the BOS, and/or response and rescue units.

According to a first embodiment of the assistance system according to the present disclosure, the evaluation unit is designed to issue data regarding an area around the current position of the first vehicle to be avoided by other road users,
  using vehicle-to-X communication to other road users and/or
  using a stationary data processing unit external to the vehicle, the processing unit being set up at least to provide to road users updated online traffic data and/or a dynamic navigation route calculation.

According to a second embodiment of the assistance system, the evaluation unit is designed to establish the size of the area around the current position of the first vehicle to be avoided by other road users, taking into account the severity of the accident, the type of breakdown and/or the hazard class of the first vehicle.

Furthermore, it can be advantageous for the evaluation unit of the assistance system to have access to digital street data and to be designed to determine the size of the area around the current position of the first vehicle to be avoided by other road users, taking into account the type of street on which the first vehicle which suffered the accident or experienced the breakdown is currently located.

According to another embodiment, the assistance system can comprise a camera unit for recording an environment around the first vehicle and the evaluation unit can be designed to establish the size of the area around the current position of the first vehicle to be avoided by other road users, taking into account the fraction of traffic lanes blocked by the accident or the breakdown of the first vehicle.

Other advantages result when the assistance system is also designed to use the communication unit to issue data regarding the current position of the first vehicle, as well as accident- and/or breakdown-related data or an evaluation result of the evaluation unit to a stationary emergency call center external to the vehicle if the evaluation unit had determined based on the evaluation of the data collected thereby that the first vehicle had suffered an accident or that a breakdown of the first vehicle has occurred.

The present disclosure also relates to a second vehicle with a communication unit for receiving data through radio signals and a navigation unit with digital street maps, characterized in that the communication unit of the second vehicle is designed to receive data from an assistance system according to embodiments of the present disclosure or from one of the advantageous improvements thereof of a first vehicle and/or data from a stationary data processing unit external to the vehicle, the processing unit being designed at least to provide road users current online traffic data and/or a dynamic navigation route calculation, and that the navigation unit is designed to:

display, on a display unit in the vehicle, the area to be avoided by other road users, based on the data received from an assistance system of a first vehicle and/or a stationary data processing unit external to the vehicle, and/or to calculate a route to help the second vehicle leave or avoid the area to be avoided, and/or accept a route received from a stationary data processing unit external to the vehicle and calculated thereby for the second vehicle based on the data transferred from an assistance system of a first vehicle to the data processing unit, the second vehicle using said route to leave or avoid the area to be avoided.

It can be advantageous for the second vehicle to be an autonomous or automatically-controlled vehicle, and to be designed to leave or avoid the area to be avoided by other road users autonomously or through automatic control.

Also encompassed by the present disclosure is a method for transferring data regarding an accident or breakdown of a vehicle from the vehicle to other road users and/or to a stationary data processing unit external to the vehicle, said method comprising the following steps:

collecting accident- and/or breakdown-related data from at least one device in the vehicle using a detection unit in the vehicle;

determining the current position of the vehicle using a position determining unit in the vehicle;

evaluating data collected by the detection and position determining unit using an evaluation unit in the vehicle; and issuing data regarding an area around the current position of the vehicle to be avoided by other road users automatically or after triggering of an actuating unit in the vehicle provided therefor using a communication unit in the vehicle which uses radio signals when the evaluation unit has determined based on the evaluation of the data collected thereby that the vehicle has suffered an accident or that a breakdown of the vehicle has occurred.

The method according to embodiments of the present disclosure can further comprise the step of issuing data regarding the current position of the vehicle, accident- and/or breakdown-related data from at least one device in a vehicle or an evaluation result from the evaluation unit in the vehicle using the communication unit in the vehicle which uses radio signals sent to a stationary emergency call center external to the vehicle when the evaluation unit has determined based on the evaluation of the data collected thereby that the vehicle has suffered an accident or that a vehicle breakdown has occurred.

The present disclosure also encompasses all other equivalent methods obvious to a person skilled in the art from the claims directed to an assistance system and a second vehicle, from the entire description, figures and the description of the figures.

BRIEF DESCRIPTION OF THE DRAWINGS

Other advantages, features and details of the present disclosure result from the claims, the description of embodiments below, and the drawings, in which:

The illustrations in the figures are purely schematic and not to scale. In the figures, identical or similar elements are provided with the same reference signs.

The exemplary embodiments explained below represent preferred embodiments of the present disclosure. The present disclosure is of course not limited to these exemplary embodiments.

The features and featural combinations cited above in the description and the features and featural combinations cited below in the description of embodiments, exemplary embodiments and the description of the figures and/or in the figures alone are useful not only in the respective combination given, but also in other combinations or alone, without abandoning the scope of the present disclosure.

DETAILED DESCRIPTION

Figure 1:
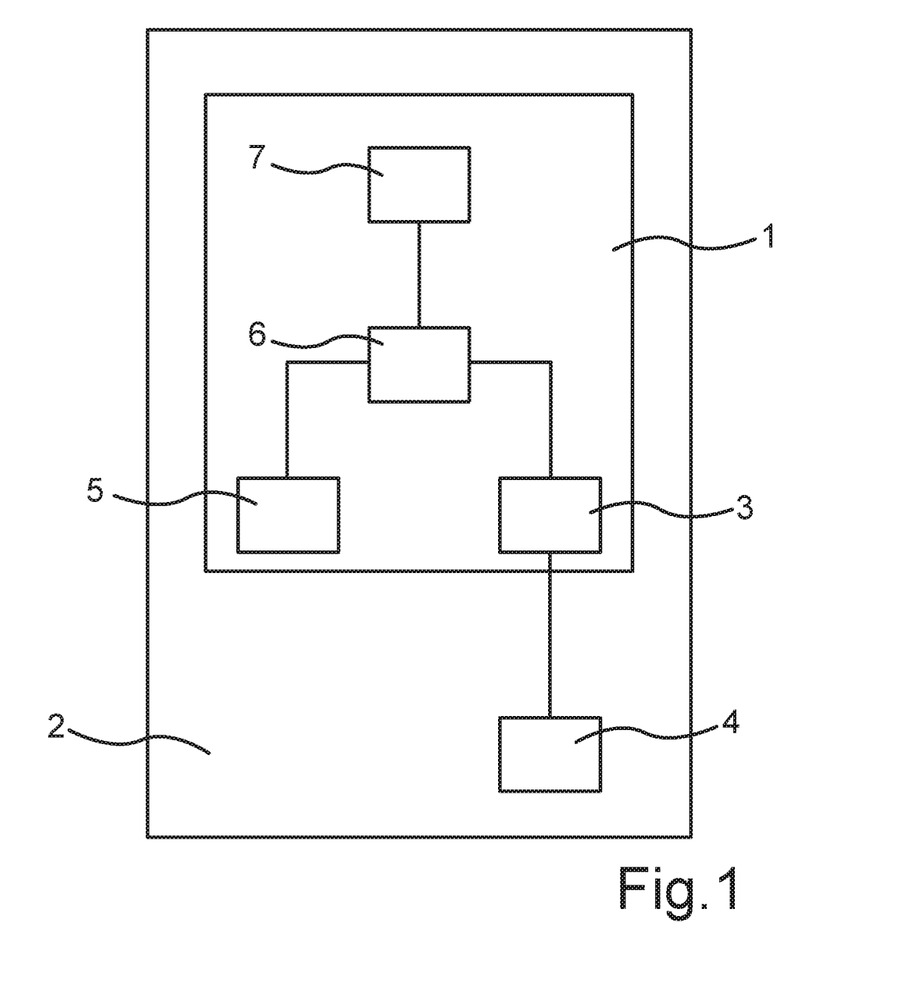
FIG. 1 depicts a schematic view of an example assistance system of a vehicle according to embodiments of the present disclosure.

As shown purely schematically in FIG. 1, an assistance system 1 according to embodiments of the present disclosure for a first vehicle 2 comprises a detection unit 3 for detecting accident- and/or breakdown-related data from at least one device 4 in the vehicle, a position determining unit 5 for determining the current position of the first vehicle 2, an evaluation unit 6 for evaluating the data detected by the detection unit 3 and the position determining unit 5 and a communication unit 7 for issuing data by means of radio signals.

Figure 2:
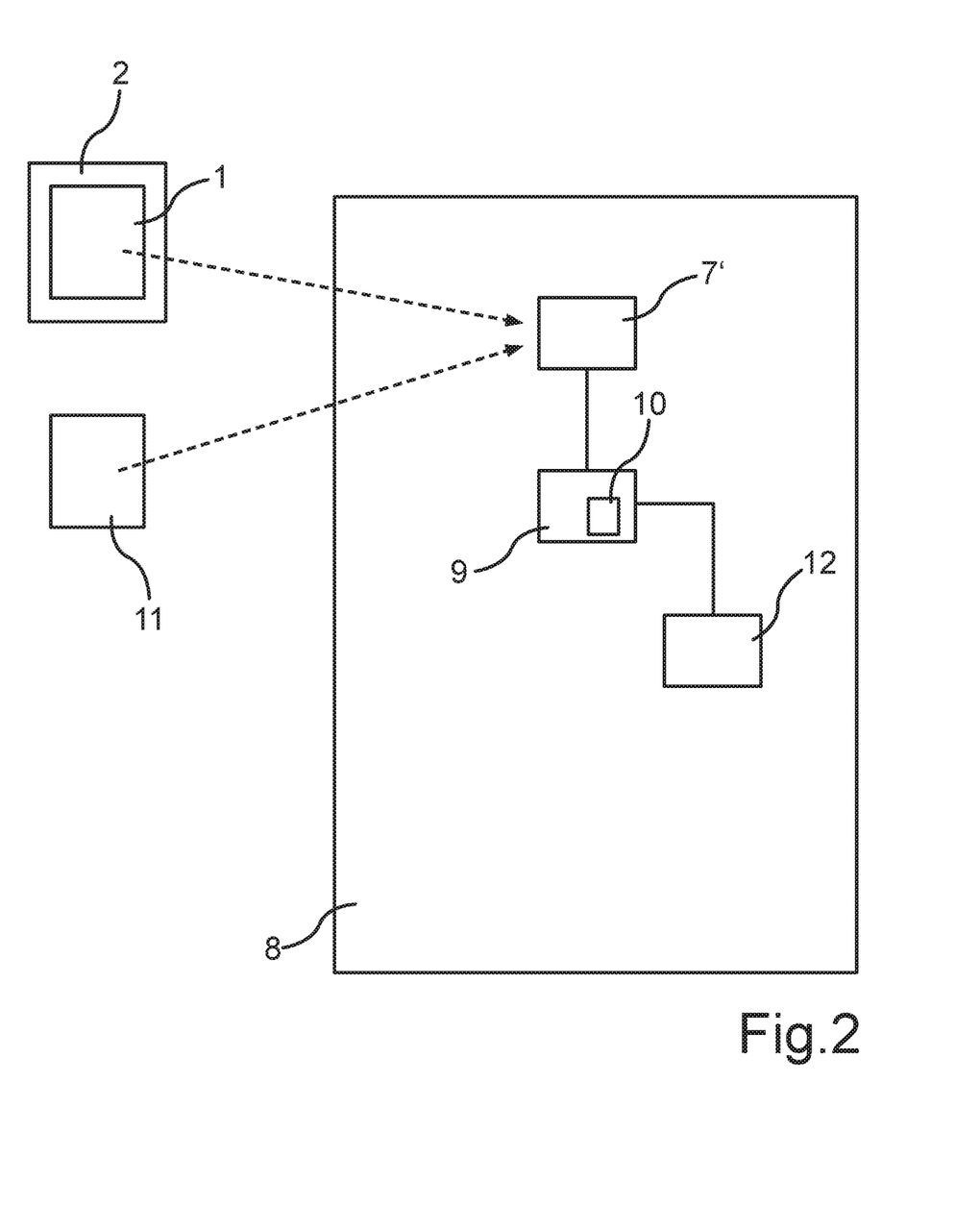
FIG. 2 depicts a schematic view of an example second vehicle according to embodiments of the present disclosure.

There are no particular limitations with regard to the technical design of system 1 described in this application and the devices 3, 4, 5, 6, 7, 7' 9, 10, 11, 12 mentioned in the present disclosure, and all systems, devices, etc., which are known by a person skilled in the art to be appropriate for the present disclosure can be used for the respective purposes mentioned. Also, regarding the required or advantageous interactions, in particular communication (wireless, wired, using a bus system) and data exchange between the devices, all known solutions can be used if they are known by a person skilled in the art to be appropriate for the respective purposes mentioned.

The detection unit 3, the position determining unit 5, the evaluation unit 6, and the communication unit 7 can be devices which are fixedly installed in the first vehicle 2, but can also be one or more mobile devices. For example, the cited devices can all be components of a mobile end device, for example—such as a smart phone, a PDA, a tablet PC, a netbook, a notebook, etc. —, wherein the data of the at least one vehicle device 4 is transferred to the mobile end device through a corresponding communication interface (wirelessly, wired, through a bus system).

The signals and data of one or more vehicle devices 4 can be detected by the detection unit 3, in particular when said signals or data can be used to determine an accident or a breakdown. An incomplete list of examples for such vehicle devices 4 include an airbag triggering unit, belt restraint triggering unit (generally expressed, triggering units for occupant safety devices), acceleration sensors (to measure accelerations in various directions, yaw rate sensors, sway rate sensors), roll-over sensors, sensors for detecting the wheel speed, the steering angle, the brake position, pedestrian safety equipment, control units for the engine, transmission, chassis, etc. (in this case fault messages for the same), monitoring equipment (such as temperature sensors, pressure sensors, liquid sensors, fuses), etc.

The signals and data of the at least one vehicle device 4 can be transferred to the detection unit 3 in any suitable way, for example wirelessly (such as using a short-range radio signal, using light signals), wired or through a bus system (often present in any case in a vehicle).

The evaluation unit 6 is commonly a digital computing device with an executable computation program installed thereon, wherein the computation program is designed to evaluate the data and signals collected by the detection unit 3 to determine whether the first vehicle 2 has suffered an accident or whether the first vehicle 2 has had a breakdown. The detection unit 3 and the evaluation unit 6 can of course constitute a common device, for example in the form of a digital computing device with corresponding interfaces for the data and the signals of the at least one vehicle device 4.

The evaluation unit 6 can also be a component of a computing device in a vehicle 2 which has other purposes as well, or the computation program for evaluating the collected data from the at least one vehicle device 4 can also be a component of a computation program for controlling, regulating and/or monitoring other functions of the vehicle 2.

For example, the position determining unit 5 can be a satellite-supported position determining unit 5 for determining the position of a vehicle 2 by determining the time it takes signals to travel from four or more navigation satellites of a global navigation satellite system (GNSS). However, in addition or alternative thereto, the position determining unit 5 can also be one which can determine the position of the vehicle 2 through mobile radio or WLAN.

Position determination using mobile radio can involve the use of the Cell ID process, for example, in which the position is determined through the radio cell (Cell ID) in which the mobile radio device is registered. The achievable precision in this case depends on the radius of the cell and may not be sufficient in rural areas with large radio cell radii. An improvement in precision in a position determination using mobile radio can be achieved if the TA parameter (TA=timing advance) is taken into account, or by using the EOTD process (EOTD=Enhanced Observed Time Difference) in which the differences in travel time of the signals from a plurality of radio cells is measured and the position of the mobile radio device is calculated based on said differences. An EOTD process can provide a precision of up to about 25 meters.

Another useful position determination method that can be used uses recognition of WLAN networks (so-called Wi-Fi positioning). In this method, WLAN networks (Hotspots) are detected and compared to digital street data. The position of the WLAN receiver (in this case a WLAN receiver disposed in a vehicle 2) can be calculated based on the WLAN networks received by said WLAN receiver. This method is particularly suitable in areas with a high density of WLAN networks since a precision of up to 20 meters can be achieved this way.

The present disclosure also encompasses the determination of a position of the first vehicle 2 by the position determining unit 5 using two or three of the basic principles outlined above (GNSS, mobile radio, WLAN), and the results of the respective position determinations compared with one another and if necessary a weighting undertaken of the position determination and/or fusion of the respective results obtained.

The communication unit 7 can be one which can send out data through so-called vehicle-to-X communication. For a communication between vehicles or between vehicles and other devices over short distances, there are so-called DSRC networks (DSRC=Dedicated Short Range Communication) based on the ETSI standard ITS G5 (ETSI=European Telecommunications Standards Institute) which come into question. This standard uses the 5.9-GHz frequency band and is a variety of the WLAN standard IEEE 802.11p, which in turn is a special version of the WLAN norm IEEE 802.11a and which was optimized for data exchange between vehicles.

In Europe, there is also the geo-networking protocol which is also used. Geo-networking is a network layering protocol which does not build on IP but which can be incorporated into IP infrastructures, and which is designed for small networks which can spontaneously form, for example in communication between vehicles.

Similar systems such as those described above for Europe are and are being developed in other regions of the world as well for vehicle-to-X communication, but the various systems are currently incompatible with one another or are only compatible to a limited degree.

Distances of more than 100 meters and up to a kilometer can be bridged using DSRC and ITS G5. If the assistance system 1 according to the present disclosure is only used for a vehicle-to-X communication, it is therefore sufficient for the communication unit 7 to have access to a corresponding short-range communication technology.

However, if data are transferred to a stationary data processing unit 11 or emergency call center external to the vehicle using the communication unit 7, the communication unit 7 must access a long-range communication technology, for example a transmitting device, using a 3G or 4G mobile radio standard.

If the communication unit 7 transmits data both through vehicle-to-X communication and also transmits data to a stationary data processing unit 11 or emergency call center external to the vehicle, the communication unit 7 must have access to a corresponding short-range communication technology and a corresponding long-range communication technology.

If the evaluation unit 6 determines, based on evaluation of data collected thereby, that the first vehicle 2 has suffered an accident or that the first vehicle 2 has had a breakdown, according to the embodiments of the present disclosure data regarding an area around the current position of the first vehicle 2 to be avoided by other road users are issued by the evaluation unit 6 using the communication unit 7 automatically or after an actuating unit provided in the vehicle is triggered (such as the triggering of a switch or button provided for this purpose, inputting of a corresponding spoken command, a corresponding gesture, etc., made by an occupant of the first vehicle 2).

These data can include not only the area to be avoided, but also the current position of the first vehicle 2.

To this end, it is obvious that the evaluation unit 6 must have access to the data regarding the current position of the first vehicle 2 of the position determining unit 5, and that this data must be transmitted from the position determining unit 5 to the evaluation unit 6. This can be done either using a question-answer method, or the corresponding position data can be transferred continuously or in discrete time intervals from the position determining unit 5 to the evaluation unit 6.

In a simple case, the size of the area around the current position of the first vehicle 2 to be avoided by other road users can be established in advance generally, independent of the type of the first vehicle 2 and/or whether the first vehicle 2 has had a breakdown or whether the first vehicle 2 has suffered an accident.

However, the size of the area can be established in advance differently depending on the type of vehicle (motorcycle, car, bus, truck, heavy transport vehicle, tracked vehicle, military vehicle, etc.). Also, in addition or alternative to this, the size of the area to be avoided by other road users can be selected based on whether the event in question is an accident or a breakdown (smaller in the case of a breakdown and larger in the case of an accident, for example).

In a simple embodiment, the size of the area can be indicated as the center using a circular area having a specifiable radius around the current position of the first vehicle 2. According to another embodiment, the size of the area to be avoided by other road users can be given by street sections to be kept open as much as possible for rescue and/or aid measures.

According to the present embodiments of the present disclosure, it can also or alternatively be provided that:

the evaluation unit 6 is designed to establish the size of the area around the current position of the first vehicle 2 to be avoided by other road users, taking into account the severity of the accident, the type of breakdown and/or the hazard class of the first vehicle 2;

the evaluation unit 6 has access to digital street data and is designed to determine the size of the area around the current position of the first vehicle 2 to be avoided by other road users, taking into account the type of street on which the first vehicle 2 which suffered the accident or experienced the breakdown is currently located; and/or the assistance system 1 comprises a camera unit for recording an environment around the first vehicle 2 and the evaluation unit 6 is designed to establish the size of the area around the current position of the first vehicle 2 to be avoided by other road users, taking into account the fraction of traffic lanes blocked by the accident or the breakdown of the first vehicle 2.

For example, for a road with only one lane per direction, the blocking of one lane by a normal car 2 will indicate a smaller area to be avoided by other road users than in the case of an accident of a vehicle 2 on the same street if the vehicle 2 is loaded hazardous materials. Or, it can be advantageous in the case of an accident in which a large amount of property damage and personal injuries have occurred or is assumed to have occurred, to indicate a larger area to be avoided by other road users than in a less serious accident in which only an average of smaller amount of property damage has occurred or is assumed to have occurred.

Camera equipment for recording an environment around a vehicle is known and this camera equipment can also facilitate a 360° recording of said environment. By collecting the images from a camera device, in particular a 360° camera device, and evaluating the collected images using an image evaluation software, the portion of road lanes blocked by an accident or a breakdown of the first vehicle 2 can be determined.

According to another aspect of the present disclosure, the communication unit 7 is also used to issue data regarding the current position of the first vehicle 2, as well as accident and/or breakdown-related data or an evaluation result of the evaluation unit 6 to a stationary emergency call center external to the vehicle if the evaluation unit 6 had determined based on the evaluation of the data collected thereby that the first vehicle 2 had suffered an accident or that a breakdown of the first vehicle has occurred.

In such a case, the stationary emergency call center external to the vehicle can either evaluate the accident- and/or breakdown-related data and introduce corresponding targeted measures, such as notification of aid and rescue forces and/or the notification of tow trucks or road assistance vehicles.

Data which is transferred as accident- and/or breakdown-related data are not subject to any special limitation, and this data can therefore also contain identification information, type, number of persons in the first vehicle 2, hazard class for bulk cargo and hazardous material transporters or the call number of the first vehicle 2, in addition to data collected by the detection unit 3.

If an evaluation result from the evaluation unit 6 is transferred, the result can contain not only the pure result of the evaluation process (approximately as follows: an accident has occurred at this or that severity, there has been a breakdown based on this or that defect), but a request for targeted measures can also be transferred to the emergency call center so that from there automatic targeted measures can be introduced without any further evaluation and/or assessment of the transferred data.

Also encompassed by the present disclosure is that data are always automatically issued by the assistance system 1, in particular to an emergency call center, when a specific, predefinable severity of an accident (for example one which triggers an occupant restraint system such as an airbag) is reached or has been exceeded or if a specific type of breakdown (such as a fire) has occurred.

The data issued by the first vehicle 2 regarding an area to be avoided by other road users can be received by a second vehicle 8 correspondingly equipped according to the present disclosure (and of course by a plurality of so-equipped second vehicles 8). To this end, the second vehicle 8 comprises a communication unit 7' for receiving data using radio signals and a navigation unit 9 with digital street data 10, and the communication unit 7' of the second vehicle 8 is designed to receive data from an assistance system 1 according to the present disclosure or one of the advantageous improvements and embodiments thereof of a first vehicle 2 and/or to receive data from a stationary data processing unit 11 external to the vehicle which is designed to provide road users at least with current traffic data online and/or a dynamic navigation route calculation (see FIG. 2; in FIG. 2, the elements of the assistance system 1 have been removed from the drawing for reasons of clarity; reference to FIG. 1 is made for the same).

The navigation unit 9 of the second vehicle 8 according to the present disclosure is designed to:
- display, on a display unit 12 in the vehicle (on a display, for example), the area to be avoided by other road users, based on the data received from an assistance system 1 of a first vehicle 2 and/or a stationary data processing unit 11 external to the vehicle, and/or to calculate a route to help the second vehicle 8 leave or avoid the area to be avoided, and/or
- accept a route received from a stationary data processing unit 11 external to the vehicle and calculated thereby for the second vehicle 8 based on the data transferred from the assistance system 1 of a first vehicle 2 to the data processing unit 11, the second vehicle 8 using said route to leave or avoid the area to be avoided.

Both options mentioned above can of course include an acoustic and/or haptic signal occurring in the second vehicle 8 when the data received from an assistance system 1 of a first vehicle 2 and/or from a stationary data processing unit 11 external to the vehicle is received; this will make the driver aware of the potentially hazardous area and instruct him to change his route if necessary.

If the second vehicle 8 is an autonomous or automatically-controlled vehicle 8, it is advantageous to design the same to leave or avoid the area to be avoided by other road users autonomously or through automatic control.

The stationary data processing unit 11 external to the vehicle can be a server or a server farm, connected if necessary to a network such as the Internet, for example, said server or server farm having one or more digital computing devices on which one or more executable computation programs are installed, said data processing unit comprising at least one memory unit or having access thereto, the memory unit storing data issued by the data processing unit 11, for example, or data issued by an assistance system 1, such as the area to be avoided by other road users (in a simple case a hazard radius around the current position of the first vehicle 2) in a database with online traffic data. Information regarding areas to be avoided can be made available to other road users by the stationary data processing unit 11 external to the vehicle and/or can be used for (re)calculating routes which are made available to participating vehicles by the data processing unit 11.

To this end, a data exchange can be set up between the data processing unit 11 and a participating vehicle, wherein the participating vehicle transmits the current position and driving direction thereof. From this, the data processing unit 11 can determine whether the participating vehicle is traveling along a route or a street which lies within an "area to be avoided by other road users" or if it leads to such an area, and can if necessary execute a (re)calculation of a route such that the participating vehicle leaves or avoids the area to be avoided by following said route, and can transfer this route to the participating vehicle.

The data issued by an assistance system 1 regarding an accident or a breakdown of a first vehicle 2 and regarding an area to be avoided by other road users can be provided with a time-limited validity so that said data becomes invalid automatically after a pre-defined time interval and after the expiration of the corresponding time interval signaling in the second vehicles 8 (displays, acoustic and/or haptic signals) are ended, corresponding entries in the database of the data processing unit 11 are deleted and route instructions are recalculated if necessary.

Likewise the data issued by the assistance system 1 can be re-issued at pre-defined time intervals so that the "hazard condition" remains valid. If repeated issuance does not occur in this case, it is assumed that the "hazard area" no longer exists.

Also, alternatively or in addition to the options mentioned above, a user of vehicle 2 can issue an end to the "hazardous condition" using the communication unit 7 by triggering a corresponding actuating unit in the vehicle, and/or a corresponding suspension can be exercised (for example, issued) by a BOS device or a device of an aid or rescue team.

The term "road user" as it is used in the present application is in no way limiting and can encompass other vehicles (for example a vehicle 8), in particular motorized vehicles, but also pedestrians, railway vehicles, water-borne vehicles, etc. To enable road users to receive the information regarding the first vehicle 2, the only requirement is for the users to have a corresponding receiver. This receiver can be a mobile phone or a smart phone which has been appropriately set up. The information regarding the first vehicle 2 can be received by the other road users through vehicle-to-X communication, for example (i.e. using short-range communication), directly from the first vehicle 2 or through an issuance (i.e. using long-range communication) from the stationary data processing unit 11.

In summary, it can be maintained that according to embodiments of the present disclosure a vehicle 2 involved in a breakdown/accident can recognize a critical operating state (for example a short circuit, critical temperature excess, loss of operating substances, blocking of road lanes) through internal vehicle diagnosis and if such a critical operating state is determined (a breakdown, accident), the vehicle issues data at least regarding an area to be avoided by other road users using the communication unit 7 of the vehicle.

These data can be received by other vehicles 8, for example using vehicle-to-X communication, so that these connected road users 8 are actively notified about the hazardous location. In autonomous/automatically-driven vehicles 8, it can be advantageous for said vehicles to leave or avoid the hazardous area (so-called "no-go area") on their own.

Likewise, the hazardous information, including the area to be avoided by other road users (in particular "unaffected" road users, see above; for example one or more second vehicles 8), can be stored in a database with online traffic data from a stationary data processing unit 11 external to the vehicle, and made available to other road users online (for example using active push, broadcasting, question-answer method, etc.). If the data processing unit 11 carries out a dynamic (online) navigation route calculation for participating vehicles, the data processing unit 11 can also (re)calculate route instructions for participating vehicles (such as a vehicle 8) as necessary based on the hazard information for avoiding the hazardous zone (new), and the result of the (re)calculation transmitted to the participating vehicles.

Moreover, an emergency call can be triggered by the first vehicle 2 and transmitted to an emergency call center (command center, reporting station). This emergency call can contain condition data from the self-diagnosis. According to one aspect of the present disclosure, the hazard potential can be calculated or estimated by the emergency call center through data analysis of the operating state of the first vehicle 2, and the require rescue and/or aid measures can be introduced (for example notification of the required rescue teams).

The present disclosure can comprehensively and correctly estimate hazards in street traffic quickly, dispatch rescue teams more quickly and thereby mitigate and/or eliminate hazards, keep unaffected road users away from a hazard zone and introduce predictive traffic flow optimizations.

Figure 3:
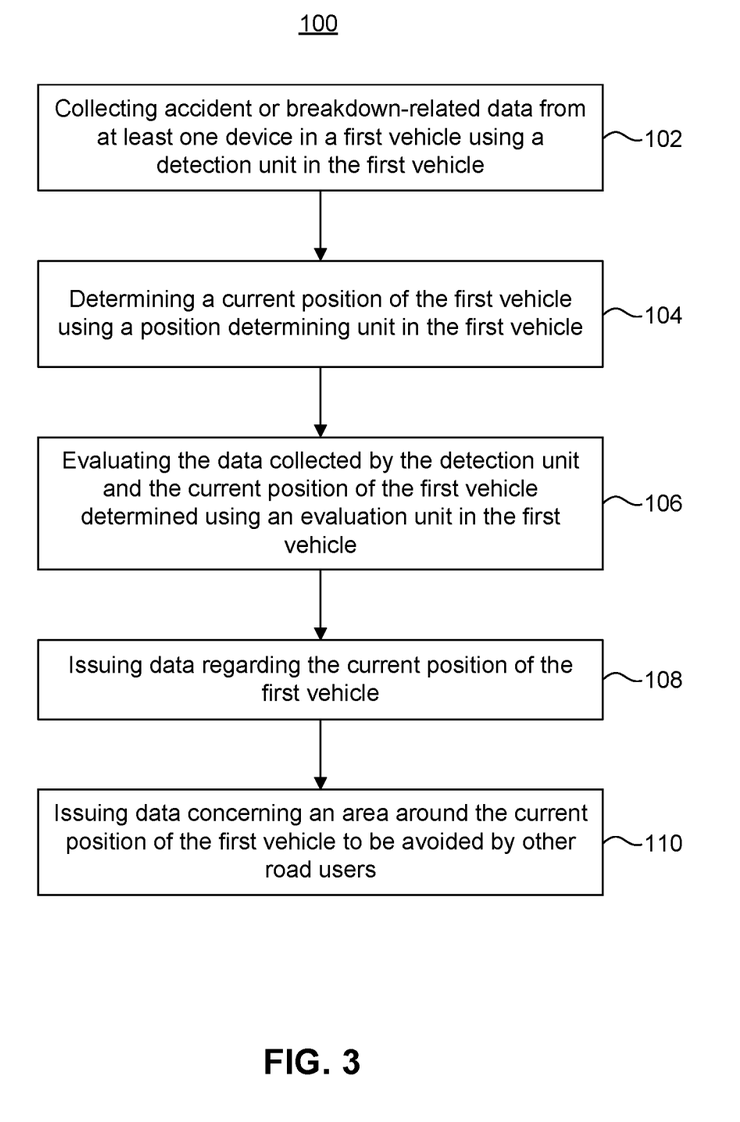
FIG. 3 depicts a flow diagram of an example method for transferring data regarding an accident or breakdown of a vehicle according to embodiments of the present disclosure.

FIG. 3 depicts a flow diagram of an example method 100 for transferring data regarding an accident or breakdown of a vehicle according to embodiments of the present disclosure. At 102, the method 100 can include collecting accident or breakdown-related data from at least one device in a first vehicle using a detection unit in the first vehicle. At 104, the method 100 can include determining a current position of the first vehicle using a position determining unit in the first vehicle. At 106, the method 100 can include evaluating the data collected by the detection unit and the current position of the first vehicle determined by the position determination unit using an evaluation unit in the first vehicle. At 108, the method 100 can include issuing data regarding the current position of the first vehicle. At 110, the method 100 can include issuing data concerning an area around the current position of the first vehicle to be avoided by other road users. The evaluation unit has access to digital street data and determines a size of the area around the current position of the first vehicle to be avoided by other road users, taking into account a severity of the accident, a type of breakdown or a hazard class of the first vehicle, and taking into account a type of street on which the first vehicle is currently located and a fraction of traffic lanes in the street blocked by the accident or the breakdown of the first vehicle, the fraction of traffic lanes determined based at least in part on one or more images recorded by a camera unit implemented in the first vehicle.

The present disclosure is suitable for all types of vehicles, in particular motorized vehicles.

Since the required equipment, components, structural elements, hardware and software components and the possible, required and advantageous interactions between the same are known to a person skilled in the art, in the present application no further explanation of them is required.

What is claimed is:

1. An assistance system for a first vehicle, comprising:
    a detection unit for detecting at least one of accident or breakdown-related data from at least one device in the first vehicle;
    a camera unit for recording an environment around the first vehicle;
    a position determining unit for determining a current position of the first vehicle;
    an evaluation unit for evaluating the data detected by the detection unit and the current position of the first vehicle determined by the position determining unit; and
    a communication unit for issuing data by means of radio signals, wherein:
        the evaluation unit is configured to issue data concerning an area around the current position of the first vehicle to be avoided by other road users using the communication unit with aid of radio signals, wherein the data is issued automatically or following a triggering of an actuating unit in the first vehicle, and wherein the data is issued when the evaluation unit has determined, based on the evaluation of the data detected by the detection unit and the current position of the first vehicle, that the first vehicle has suffered an accident, or that the first vehicle has experienced a breakdown, so that unfettered access to the current position of the first vehicle can be provided for response and rescue units, and
        the evaluation unit has access to digital street data and is configured to, in response to a detection of at least one of accident or breakdown-related data by the detection unit, determine a size of the area around the current position of the first vehicle to be avoided by other road users, taking into account a severity of the accident, a type of breakdown or a hazard class of the first vehicle, and taking into account a type of street on which the first vehicle is currently located and a fraction of traffic lanes blocked by the accident or the breakdown of the first vehicle, the fraction of traffic lanes determined based at least in part on one or more images recorded by the camera unit.

2. The assistance system according to claim 1, wherein the evaluation unit is configured to issue data regarding the area around the current position of the first vehicle to avoided by other road users using vehicle-to-X communication to at least one of other road users or a stationary data processing unit external to the first vehicle, the processing unit being configured at least to provide to road users updated online traffic data or a dynamic navigation route calculation.

3. The assistance system according to claim 1, wherein the communication unit is further configured to issue data regarding the current position of the first vehicle, as well as accident or breakdown-related data or an evaluation result of the evaluation unit, to a stationary emergency call center external to the first vehicle when the evaluation unit has determined, based on the evaluation of the data detected by the detection unit and the current position of the first vehicle, that the first vehicle had suffered an accident or that a breakdown of the first vehicle has occurred.

4. A method for transferring data regarding an accident or breakdown of a first vehicle from the first vehicle to at least one of other road users or a stationary data processing unit external to the first vehicle, the method comprising:
    collecting accident or breakdown-related data from at least one device in the first vehicle using a detection unit in the first vehicle;
    determining a current position of the first vehicle using a position determining unit in the first vehicle;
    evaluating the data collected by the detection unit and the current position of the first vehicle determined by the position determination unit using an evaluation unit in the first vehicle; and
    issuing data concerning an area around the current position of the first vehicle to be avoided by other road users using a communication unit with aid of radio signals, wherein the data is issued automatically or following a triggering of an actuating unit in the first vehicle, and wherein the data is issued when the evaluation unit has determined, based on the evaluation of the data collected by the detection unit and the current position of the first vehicle, that the first vehicle has suffered an accident or that the first vehicle has experienced a breakdown so that unfettered access to the current position of the first vehicle can be provided for response and rescue units, wherein the evaluation unit has access to digital street data and determines a size of the area around the current position of the first vehicle to be avoided by other road users, taking into account a severity of the accident, a type of breakdown or a hazard class of the first vehicle, and taking into account a type of street on which the first vehicle is currently located and a fraction of traffic lanes in the street blocked by the accident or the breakdown of the first vehicle, the fraction of traffic lanes determined based at least in part on one or more images recorded by a camera unit implemented in the first vehicle.

5. The method according to claim 4, further comprising:

issuing data regarding the current position of the first vehicle, the data comprising accident or breakdown-related data from at least one device in the first vehicle or an evaluation result from the evaluation unit in the first vehicle, the data issued using the communication unit in the first vehicle, which provides radio signals to a stationary emergency call center external to the first vehicle when the evaluation unit has determined, based on the evaluation of the data collected by the detection unit and the current position of the first vehicle, that the first vehicle has suffered an accident or that a vehicle breakdown has occurred.

* * * * *